United States Patent [19]
Leske

[11] Patent Number: 5,473,385
[45] Date of Patent: Dec. 5, 1995

[54] CLOCK CORRECTION IN A VIDEO DATA DECODER USING VIDEO SYNCHRONIZATION SIGNALS

[75] Inventor: Lawrence A. Leske, San Carlos, Calif.

[73] Assignee: TV/COM Technologies, Inc., San Diego, Calif.

[21] Appl. No.: 254,992

[22] Filed: Jun. 7, 1994

[51] Int. Cl.$^6$ ............................................. H04N 5/04
[52] U.S. Cl. .................... 348/500; 348/536; 348/537; 348/464
[58] Field of Search ........................ 348/500, 507, 348/526, 536, 537, 384, 469, 464, 614, 611; 358/148, 158; 375/355, 362; H04N 5/04, 13/00

[56] References Cited

U.S. PATENT DOCUMENTS

| | | | |
|---|---|---|---|
| 5,025,258 | 6/1991 | Duttweiler | 348/384 |
| 5,031,053 | 7/1991 | Chamzas | 348/384 |
| 5,148,271 | 9/1992 | Kato | 348/384 |

*Primary Examiner*—Victor R. Kostak
*Assistant Examiner*—Sherrie Hsia
*Attorney, Agent, or Firm*—Baker, Maxham, Jester & Meador

[57] ABSTRACT

In a system which encodes video data in response to an encoding clock, transmits the encoded video data with an encoder clock signal representing the encoding clock frequency, and decodes the video data in response to a decoding clock, system clock accuracy is maintained by adjusting the decoding clock frequency. In order to reduce buffer requirements and to prevent deterioration of video program presentation, the decoding clock frequency is adjusted by slewing only during composite video synchronization periods when composite video decoded from the encoded video stream is not being presented. The preferred video synchronization periods are the vertical blanking interval and the front porch period. Restriction of decoding clock rate adjustment to these periods ensures that decoding clock slew rate limits may be unrestricted, thereby avoiding noticeable effects in the video program presentations.

26 Claims, 4 Drawing Sheets

COMPOSITE COLOR VIDEO

CLOCK CORRECTION IN A VIDEO DATA DECODER USING VIDEO SYNCHRONIZATION SIGNALS

BACKGROUND OF THE INVENTION

The invention concerns decoding of an encoded video signal and particularly relates to the adjustment of a decoding clock to accommodate mismatches between its frequency and the frequency of an encoding clock in response to video synchronization signals in composite video obtained from decoded video data.

Efficient distribution of video data programming to multiple users is greatly assisted by compression techniques that maximize the amount of video data that can be packed into transmission channels. Two well-known techniques for video data compression are the MPEG 1 & 2 standards promulgated by the ISO (International Organization for Standardization). Both standards contemplate the compressive encoding of video data from a plurality of program data sources in response to a system clock. An MPEG encoder operates in response to the system clock, embodied as an encoding clock, producing an MPEG transport packet stream that includes encoded video data and, periodically, a data structure called a "program clock reference" from which the encoding clock frequency can be derived.

The MPEG transport packet stream is sent, using conventional means, through transmission channels in various media, including the atmosphere, space, and cable. Transmitted MPEG transport packet streams are received by a receiver/decoder that decodes video program data, providing composite video and accompanying audio data on a per-channel basis for user consumption. The operations of the receiver/decoder are synchronized by the system clock in the form of a decoding clock that is local to the receiver/decoder. The decoding clock is substantially identical to the encoding clock; however, it can vary in frequency and phase, with concomitant deterioration of decoded video programming.

High-quality receiver/decoder design should provide reliable video timing at the receiver/decoder by adjustment of the decoding clock rate to accommodate deviations of the encoding clock rate from a standard-specified system clock rate. Good design assumes that the encoding clock rate is "correct" and locks the frequency of the decoding clock to that of the encoding clock. This ensures system clock accuracy and reduces undesirable artifacts in composite video obtained by decoding the transmitted video data stream.

Decoding clock design must ensure accuracy of the decoding clock frequency with respect to the encoding clock frequency and must limit the rate at which the decoding clock is slewed.

In this regard, the decoding clock frequency must match the encoding clock frequency in order to prevent overflow and underflow of decoder buffers that may occur if the frequencies are not equal. Both overflow and underflow are prevented by locking the decoding clock frequency to the frequency of the encoding clock. Clock locking design must account for the allowance in the MPEG standards for encoding clock deviation from the system clock frequency. The standards provide for slewing the encoding clock within limits in order to maintain equivalency with the prescribed system clock frequency. The deviation and slew rate standards are applied to the encoding clock, with the assumption that the decoder will attempt to accurately reproduce the encoding clock. The drift or slew rate at the decoder is not required to adhere to the rate prescribed by the standard. Home video displays, which have tolerant synchronization circuits, can accommodate a significant degree of adjustment flexibility in decoding clock operation; VCRs, however, are far less tolerant. In either case, the frequency deviation and slew rate flexibility in the decoder is reflected in a substantial increase in size of decoder buffers in order to accommodate the decoder's lag in frequency acquisition.

Another problem encountered by allowing too much flexibility in decoding clock adjustment will arise when the decoder derives from the decoding clock a sub-carrier clock that is used to process sub-carrier burst frequencies. In this case, a slew rate limit is necessary to ensure that the sub-carrier clock will accurately track the sub-carrier burst frequency without causing noticeable color shifts. For example, the usual slew rates observed for chroma clock adjustment according to typical color specifications such as PAL would be violated by a decoding clock designed to the slew rate prescribed by the MPEG standards.

Thus, there is a significant tension between two design considerations in the decoding clock circuit. First, the best strategy to reduce decoder buffer size in order to accommodate video data stream overflow or underflow is to increase the slew rate of the decoding clock at the decoder. However, if the slew rate is too high for the derived chroma sub-carrier, then noticeable color shifts will occur, which are unacceptable.

SUMMARY OF THE INVENTION

Therefore, it is a principal objective of this invention to provide for slewing the decoding clock at a maximum rate to reduce the amount of buffer required to accommodate overflow and underflow, while avoiding significant deterioration that fast slewing may effect in a video presentation.

The objective is met by an invention that reflects the inventor's critical observation that if decoding clock frequency changes are gated to occur during blanking periods in which video or data is not being presented, then buffer size can be reduced, while noticeable effects on the video presentation can be avoided. Therefore, according to the invention, the decoding clock frequency changes are gated to occur during blanking periods such as the vertical blanking interval or the front porch, both of which are available during the generation of composite video data.

The achievement of the objective by the invention, so limited, will be appreciated when the following detailed description is read with reference to the below-described drawings.

DETAILED DESCRIPTION OF THE PREFERRED EMBODIMENT

Figure 1:
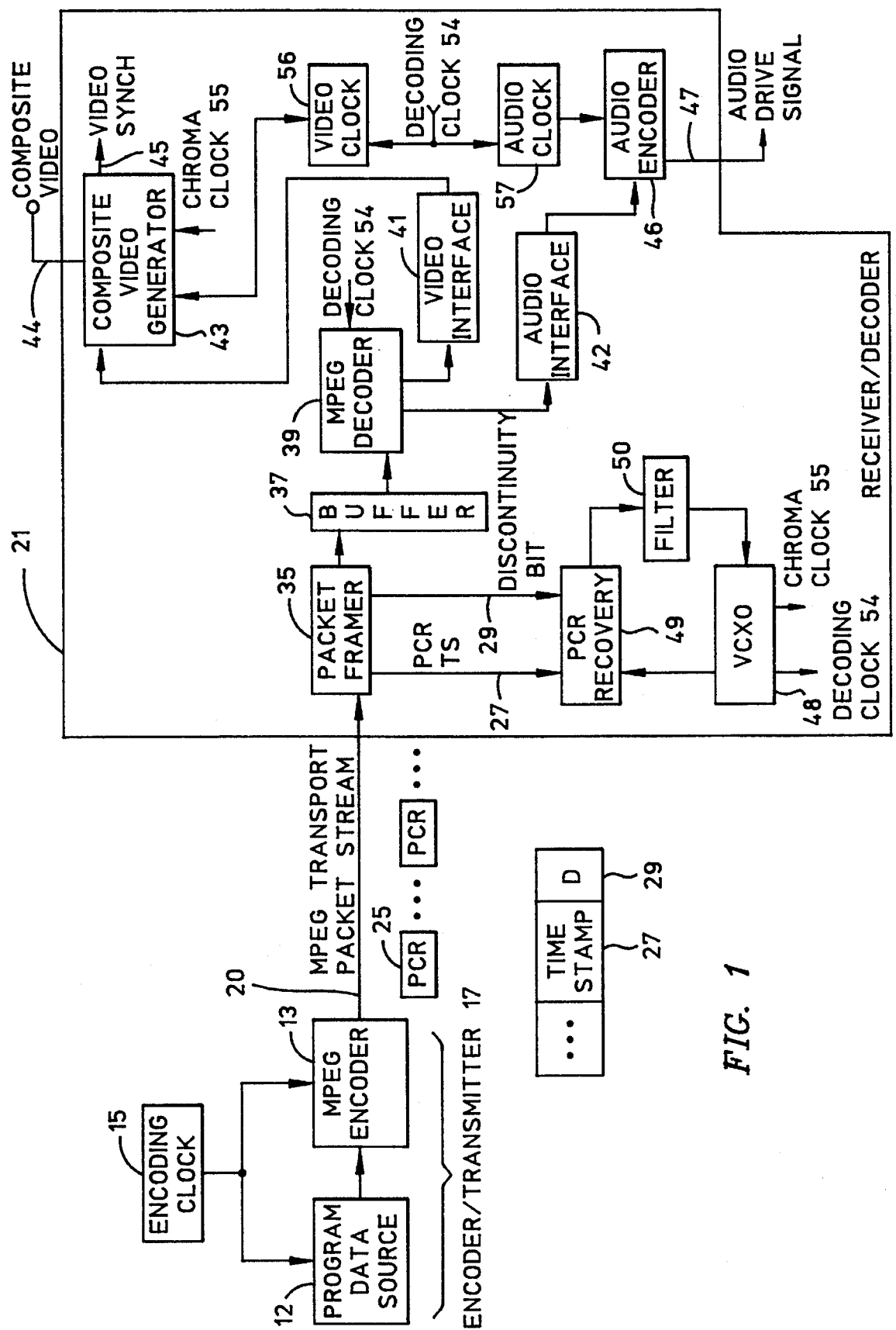
FIG. 1 is a block diagram illustrating a video data transmission system in which the invention operates.

Refer now to the figures, in which like reference numerals indicate identical elements throughout the description. In FIG. 1, there is illustrated a system for transporting encoded video data. The illustration presented in FIG. 1 does not include any elements for modulation, transmission, reception, and demodulation, it being understood that such elements are conventional and that their incorporation into the practice of the invention would be manifest to the skilled practitioner.

In FIG. 1, a program data source 12 generates video data including video and audio elements. Video data is provided to the input of an encoder that implements any of a plurality of compression methods for encoding video data. In the preferred embodiment, the encoder operates according to either of the MPEG standards, although the inventor contemplates that other compression standards may be employed. The program data source 12 and the encoder 13 operate in response to an encoding clock circuit 15 providing an encoding clock having an encoding clock frequency according to the standard by which the encoder 13 operates. All of the elements, 12, 13, and 15 are included in an encoder/transmitter 17 that processes the encoded video data produced by the encoder 13 into a video data stream 20 for transmission to one or more receiver/decoders, such as the receiver/decoder 21.

The nature of the transmitted video data stream 20 determines the type of technique which the encoder 13 implements. In this regard, the transmitted video data stream 20 must include periodic encoder clock signals having data structures that convey information about the frequency of the encoding clock. Relatedly, the MPEG standards provide for a MPEG transport packet stream that includes encoded video data and that also includes ten encoder clock signals per second in the form of "program clock reference" (PCR) structures, one of which is indicated by reference numeral 25. Each PCR includes a timestamp field 27 from which the instantaneous frequency of the encoding clock may be derived, followed by a discontinuity indicator bit (D) 29 for framing the PCR 25.

The receiver/decoder 21 includes a packet framer 35 that disassembles the video data stream 20, separating the encoded video data from the encoder clock signals. The encoded video data is provided to a buffer 37 that stores the de-packetized encoded video data until called for by a decoder 39. The decoder 39 operates according to the standard defining the encoder 13 by decoding the encoded video data. In the preferred embodiment, the decoder 39 operates according to either of the MPEG standards mentioned above. The decoded video data is separated by the decoder 39 into video and audio data streams that are provided, respectively, to a video interface 41 and an audio interface 42. The video interface 41 passes the video data to a composite video generator 43 that operates conventionally in response to the video data by producing composite video data 44 in a standard presentation format including, but not limited to, a raster-scanned format. In generating the composite video data 44, the composite video generator 43 must produce video synchronization signals having forms that are standard for the particular presentation format. For example, the raster-scanned video format requires the generation of vertical blanking interval (VBI) signals, as well as horizontal synchronization signals that include the well-known front porch interval.

The audio signals derived from the encoded video data are provided to a conventional audio encoder 46 that produces an audio drive signal 47 in synchronization with the composite video signal 44.

The operations of the receiver/decoder 21 are synchronized by the system clock embodied in the receiver/decoder 21 by a decoding clock produced by a voltage-controlled crystal oscillator (VCXO) 48. The VCXO 48 produces the decoding clock on the design assumption that the encoding clock correctly embodies the system clock. Consequently, the VCXO 48 is coupled to a clock frequency adjustment loop including a PCR recovery circuit 49 and a filter 50. The PCR recovery circuit 49 receives the PCR timestamp 27 and a discontinuity bit 29 ten times per second, compares the frequency of the decoding clock produced by the VCXO 48 to the encoding clock frequency derived from the timestamp, and produces an error signal that is filtered at 50 and provided to an adjustment input of the VCXO 48.

The VCXO 48 produces both the decoding clock 54 and a sub-carrier clock for color burst synchronization. The sub-carrier clock is denoted as the chroma clock 55. The decoding clock 54 is coupled to the decoder 39, to a video clock circuit 56, and to an audio clock circuit 57. The video and audio clocks are derived from the decoding clock 54 by the circuits 56 and 57 for provision to the composite video generator 43 and the audio encoder 46. In addition, the chroma clock 55 is provided to the composite video generator to synchronize the color burst oscillator in the composite video generator 43.

The MPEG 2 standard for compressed video and audio requires that the encoded video data be captured with sample clocks that are specified with a constant rational relationship to the system clock, which is specified at 27 MHz. The primary purpose of the system clock is to match decoder rates with encoder rates. If the rates are not equal, then the receiver/decoder's buffer 37 will likely overflow or underflow, causing undesirable effects in the audio and video portions of the video presentation.

According to the MPEG 2 standard, the system clock is distributed in transport packet stream by means of the PCRs 25, together with the encoded video data. Consequently, the encoding clock information in the encoder clock signals is subject to the same statistical delays as the rest of the transport packet stream. These delays are a source of phase uncertainty, or phase noise, which interferes with reconstruction of the video data at the receiver/decoder 21. This, naturally, affects the rate at which the system clock is acquired by the receiver/decoder 21, which is termed "the slew rate of acquisition." Due to the nature of composite video signals, it is important that the system clock be acquired very quickly, otherwise disturbances with the video presentation will be evident.

In tension with the requirement for rapid acquisition of the system clock is the necessity to limit the slew rate of the decoding clock to ensure that any sub-carrier circuits will accurately track the chroma clock without causing noticeable color shifts. Assuming that the chroma clock will be derived from the system clock in order to reduce system cost, the slew rate limits for the decoding clock are manifestly those of the particular color specification defining the color scheme of the composite video data 44. Changes which exceed the specified chroma clock slew rate will likely result in changes to the color of images on a TV receiver.

Figure 2:
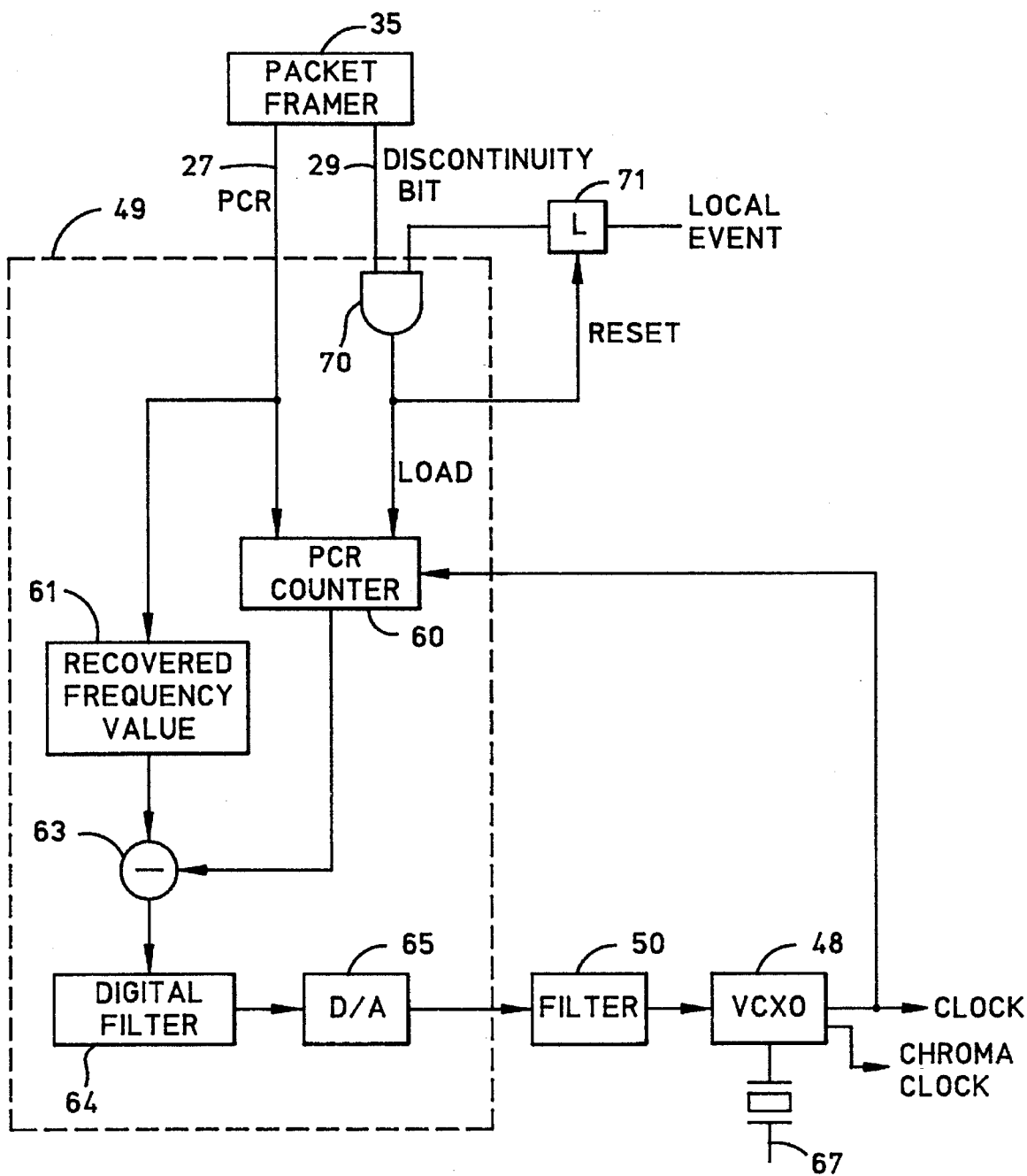
FIG. 2 is a block diagram illustrating decoding clock correction without gating.

If there were no jitter on the PCRs in the transport packet stream 20, the simple phase-locked loop circuit illustrated in FIG. 2 would be sufficient to recover the system clock in a manner that would meet the needs for buffer overflow and underflow and yet provide a stable derived chroma clock for the composite video generator 43. Normally, a TV receiver will acquire the chroma sub-carrier clock within a fraction of a second when a channel is first selected. This will interfere with the video presentation; however, the interference is not objectionable because the viewer expects the brief disturbance during turn on and channel changes.

Therefore, with reference to FIG. 2, the simple phase-locked apparatus is characterized in that the PCR recovery circuit 49 includes a PCR counter 60 that receives and periodically loads the encoding clock frequency derived from the PCR timestamp field of the PCR. This value is loaded when a local event such as a channel change or TV set turn on occurs. The loaded value is compared with the succession of encoding frequency values that are derived from the timestamp fields of the ten PCRs per second that are embedded in the MPEG transport packet stream. These values are compared in a digital subtractor 63 whose output is filtered digitally at 64, converted to analog form at 65 by a digital-to-analog (D/A) converter, filtered at 50, and input as an error signal into a VCXO 48 that is also driven by a crystal oscillator 67. The clock signal output by the VCXO 48 is sent back to the PCR counter 60, to lock the loop for adjustment of the frequency of clock output by the VCXO 48. The PCR counter 60 is loaded in response to local events by means of an AND circuit 70 that receives as inputs the discontinuity bit 29 from each PCR and the occurrence of the local event, latched at 71.

The clock signal generated by the VCXO 48 in FIG. 2 would be adequately controlled, were it not for the effects of phase noise introduced by transmission of the transport packet stream. The magnitude of the phase noise may be sufficient to prevent rapid acquisition of the system clock. Assuming that local oscillators in the receiver/decoder 21 satisfy the encoder/decoder standard accuracy, the frequency uncertainty introduced by phase noise may be great enough to require unacceptably long acquisition times. Of course, the decoding clock might be slewed quickly. However, the slew rate cannot resultantly slew the derived chroma clock so quickly as to cause undesirable color shifts in the video program presentation. The simple alternative of long, slow acquisition, say 100's of seconds, to prevent undesirably fast chroma slew, can cause overflow or underflow in the receiver/decoder buffer 37.

The invention provides the ability to slew the decoding clock at a high rate, thereby reducing the prospect of buffer overflow or underflow. The slew rate is faster than chroma specifications permit, yet the effects do not degrade the video presentation. These competing goals are supported in the invention by making decoding clock changes only during non-video display times, but not during critical timing events such as chroma burst and horizontal synch periods. Preferably, decoding clock changes are made during vertical blanking intervals (VBI) or during the so-called front porch of a horizontal line, which occurs 1.5 microseconds after the active video, and just before beginning of the horizontal synch that includes the sub-carrier burst signal.

Since the decoding clock is also used to drive operations of the audio encoder 46, it might be most useful to make decoding clock corrections during the front porch interval. This is due to the fact that the front porch occurs at the horizontal line frequency of about 15,750 Hz. At this frequency the human ear is relatively insensitive to minor changes in frequency, so that any short change in decoding clock frequency would be largely imperceptible and barely measurable. As is known, video blanking intervals occur much less frequently than the front porch, and so may introduce audibly perceptible effects. Nevertheless, the inventor contemplates use of the video blanking interval in the manner illustrated in FIG. 3.

Figure 3:
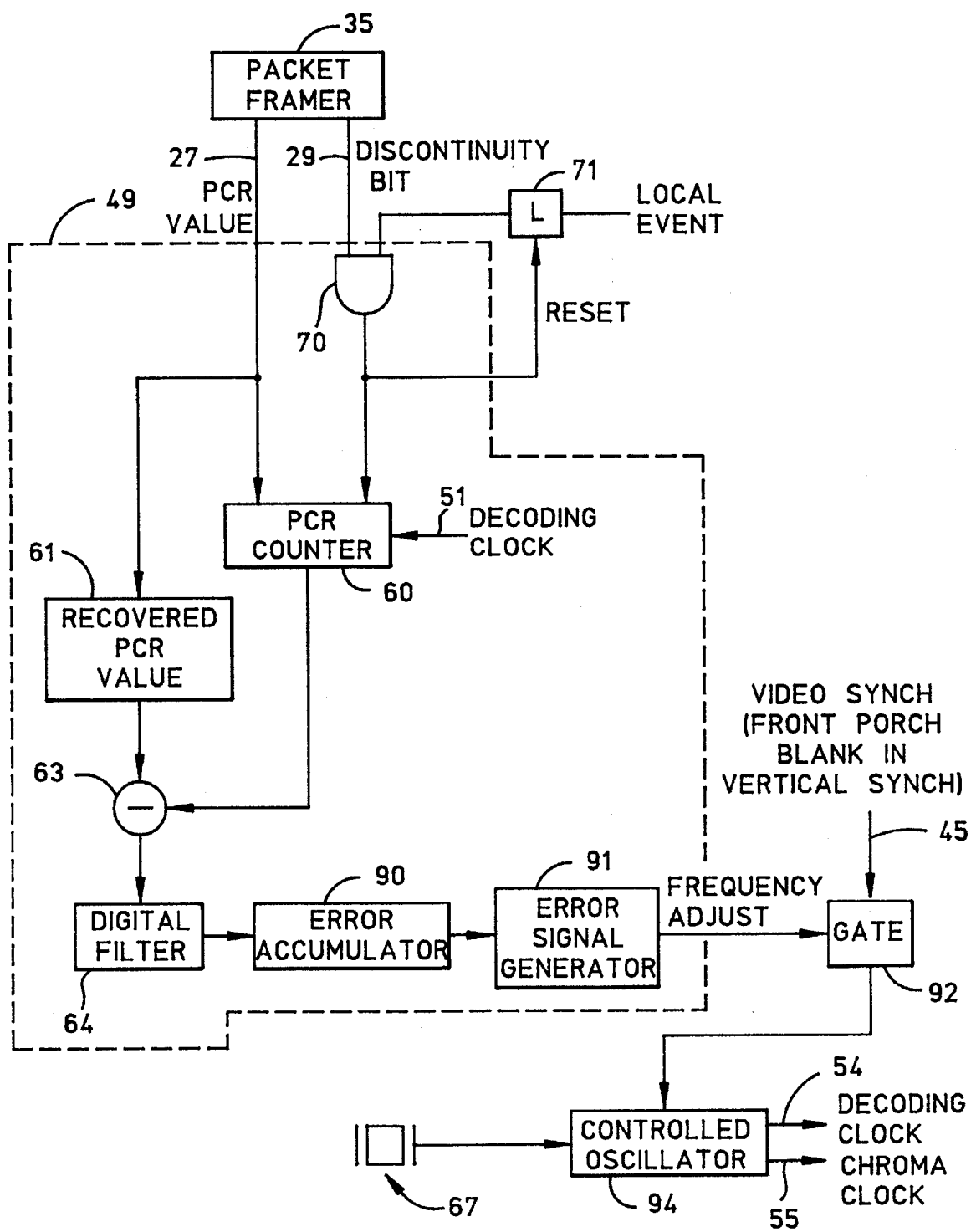
FIG. 3 is a block diagram illustrating decoding clock correction with gating according to the invention.

FIG. 3 implements a frequency-locking loop that is equivalent in all respects to the phase-locked loop of FIG. 2, with the exception that the D/A converter 65 and analog filter 50 of FIG. 2 are eliminated and frequency correction is gated. Instead, the output of the digital filter 64 provides an error value that is accumulated by an error accumulator 90 that feeds an error signal generator 91. The error signal generator processes the accumulated error signal, producing a frequency adjustment signal for advancing or retarding oscillator frequency. The frequency adjustment signal is gated by a gating circuit 92 that is controlled by the selected video synchronization signal 45. Thus, at either the vertical blanking interval or the front porch, the gating circuit 92 passes the frequency adjustment signal for oscillator correction for the duration of the selected video synchronization signal. The frequency adjustment signal is provided by the gating circuit 92 to a controlled oscillator 94 that also receives crystal oscillator 67. The controlled oscillator 94 produces the decoding clock 54 and chroma clock 55 according to known methods that may be selected according to design considerations. For example, the controlled oscillator 94 may comprise a numerically controlled oscillator (NCO) or a digitally-controlled phase shift oscillator. During the periods when the gating circuit 92 connects the frequency adjustment circuit to the controlled oscillator 94, the oscillator 94 slews the frequency of the decoding clock as required to adjust the operations of the receiver/decoder 21 to accommodate differences in frequency between the encoding clock and the decoding clock. At all other times, the oscillator 94 produces the decoding clock 54 at the specified system clock rate.

Figure 4:
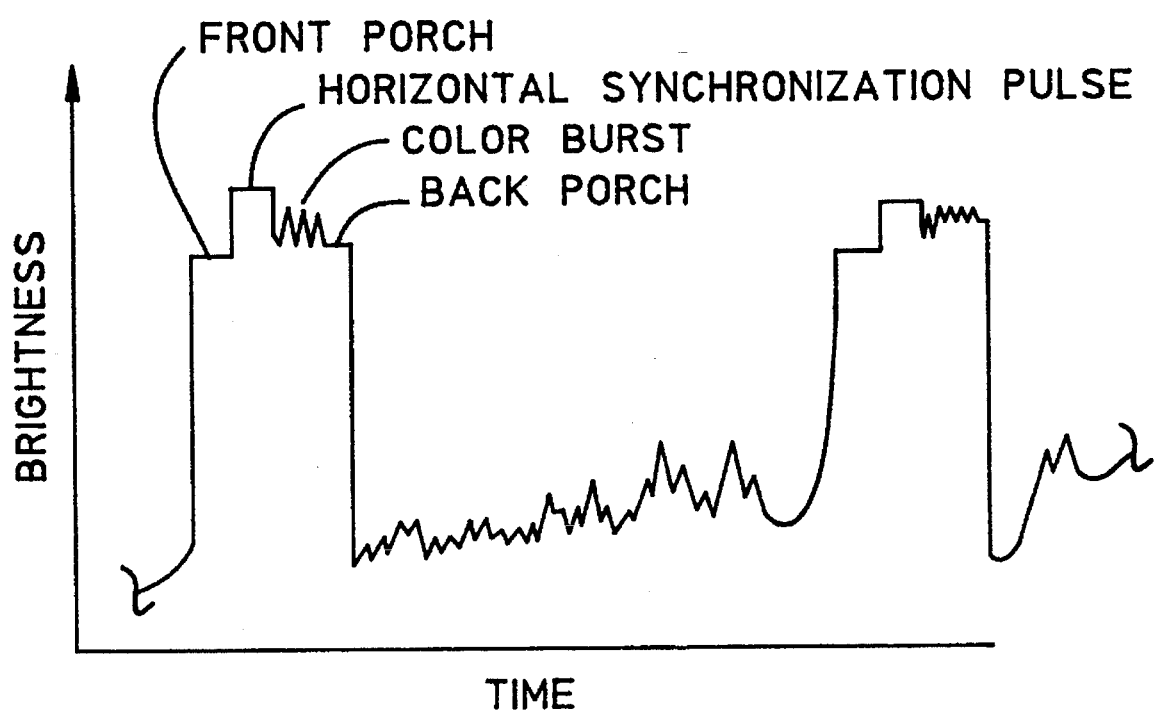
FIG. 4 is a waveform diagram illustrating video synchronization signals used to gate a decoding timing circuit having the architecture illustrated in FIG. 3.

FIG. 4 illustrates a typical composite picture color signal waveform including a front porch and a color sub-carrier burst. The front porch occurs at the end of a horizontal sweep. As in known in the art, the vertical blanking signal occurs during the high frequency portion of a sawtooth wave that provides the vertical component in a raster-scanned video format.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for alignment of a decoding clock in a video data decoder with an encoding clock, comprising the steps of:

receiving a video data stream with encoded video data at the video data decoder, the video data stream including an encoder clock signal representing a frequency of the encoding clock with which the video data is encoded;

providing the decoding clock at the video data decoder;

decoding the video data from the video data stream at the video data decoder in response to the decoding clock;

producing composite video data from the decoded video data at the video data decoder; and in response to the encoder clock signal and to video synchronization signals in the composite video data, adjusting the decoding clock to match the decoding clock with the encoding clock.

2. The method of claim 1, wherein the adjusting step is performed in response to a vertical blanking signal in the composite video data.

3. The method of claim 2, wherein the decoding clock has a decoding clock frequency, the adjusting step including changing the frequency of the decoding clock during the vertical blanking signal.

4. The method of claim 1, wherein the decoding clock has a decoding clock frequency, the adjusting step including slewing the frequency of the decoding clock during a vertical blanking interval in the composite video data.

5. The method of claim 1, wherein the adjusting step is performed in response to a front porch signal in the composite video data.

6. The method of claim 5, wherein the decoding clock has a decoding clock frequency, the adjusting step including changing the frequency of the decoding clock during the front porch signal.

7. The method of claim 1, wherein the decoding clock has a decoding clock frequency, the adjusting step including slewing the frequency of the decoding clock during a front porch period in the composite video data.

8. A method for alignment of a decoding clock in a video data decoder with an encoding clock, comprising the steps of:

receiving a video data stream with encoded video data at the video data decoder, the video data stream including an encoder clock signal representing a frequency of the encoding clock with which the video data is encoded;

providing the decoding clock at the video data decoder, the decoding clock having a frequency that is substantially equal to the encoding clock frequency;

decoding the video data from the video data stream at the video data decoder in response to the decoding clock;

producing composite video data from the decoded video data at the video data decoder; and slewing the decoding clock frequency to reduce a frequency difference between the encoding clock and the decoding clock, the slewing being performed in response to the encoder clock signal and to video synchronization signals in the composite video data.

9. The method of claim 8, wherein the slewing step is performed in response to a vertical blanking signal in the composite video data.

10. The method of claim 8, wherein the slewing step is performed in response to a front porch signal in the composite video data.

11. A method for alignment of a decoding clock in a video data decoder with an encoding clock, comprising the steps of:

receiving a video data steam with encoded video data at the video data decoder, the video data stream including an encoder clock signal representing a frequency of the encoding clock with which the video data is encoded;

providing the decoding clock at the video data decoder, the decoding clock having a clock frequency that is substantially equal to the encoding clock frequency;

decoding the video data from the video data stream at the video data decoder in response to the decoding clock;

producing composite video data from the decoded video data at the video data decoder; and changing the frequency of the decoding clock to reduce a frequency difference between the encoding clock and the decoding clock, the changing being performed in response to the encoder clock signal and to video synchronization signals in the composite video data.

12. The method of claim 11, wherein the changing step is performed in response to a vertical blanking signal in the composite video data.

13. The method of claim 11, wherein the changing step is performed in response to a front porch signal in the composite video data.

14. A combination for adjustment of a decoding clock in a video data decoder, the decoding clock having a decoding clock frequency that is substantially equal to an encoding clock frequency, the combination comprising:

means for receiving a video data stream with encoded video data, the video data stream including an encoder clock signal representing the frequency of the encoding clock with which the video data is encoded;

a decoding clock circuit for providing the decoding clock;

a video data decoder coupled to the decoding clock circuit and to the means for receiving for decoding the video data from the video data stream in response to the decoding clock;

a composite video generator coupled to the video data decoder for generating composite video data from the decoded video data in response to the decoding clock; and a clock rate alignment circuit coupled to the composite video generator and to the decoding clock circuit for adjusting the decoding clock to match the decoding clock with the encoding clock in response to the encoder clock signal and to video synchronization signals in the composite video data.

15. The combination of claim 14, wherein the clock rate alignment circuit adjusts the decoding clock in response to a vertical blanking signal in the composite video data.

16. The combination of claim 15, wherein the clock rate alignment circuit adjusts the decoding clock by changing the frequency of the decoding clock during the vertical blanking signal.

17. The combination of claim 14, wherein the clock rate alignment circuit adjusts the decoding clock by slewing the frequency of the decoding clock during a vertical blanking interval in the composite video data.

18. The combination of claim 14, wherein the clock rate alignment rate circuit adjusts the decoding clock in response to a front porch signal in the composite video data.

19. The combination of claim 18, wherein the clock rate alignment circuit adjusts the decoding clock by changing the frequency of the decoding clock during the front porch signal.

20. The combination of claim 14, wherein the clock rate alignment circuit adjusts the decoding clock by slewing the frequency of the decoding clock during a front porch period in the composite video data.

21. A combination for alignment of a decoding clock with an encoding clock, the combination comprising:

means for receiving a video data stream with encoded video data, the video data stream including an encoder clock signal representing a frequency of the encoding clock with which the video data is encoded;

a decoding clock circuit for providing the decoding clock having a frequency that is substantially equal to the encoding clock frequency;

a video data decoder coupled to the means for receiving and to the decoding clock circuit for providing the video data in response to the video data stream and the decoding clock;

a composite video generator coupled to the decoding clock circuit and the video data decoder for generating composite video data from the provided video data in response to the decoding clock; and a clock rate alignment circuit coupled to the composite video generator, to the means for receiving, and to the decoding clock circuit for slewing the frequency of the decoding clock in response to the encoder clock signal and to video synchronization signals in the composite video data.

22. The combination of claim 21, wherein the video synchronization signals include, a vertical blanking signal.

23. The combination of claim 21, wherein the video synchronization signals include a front porch signal.

24. A combination for alignment of a decoding clock with an encoding clock, the combination comprising:

means for receiving a video data stream with encoded video data, the video data stream including an encoder clock signal representing a frequency of the encoding clock with which the video data is encoded;

a decoding clock circuit for providing the decoding clock having a frequency that is substantially equal to the encoding clock frequency;

a video data decoder coupled to the means for receiving and to the decoding clock circuit for providing the video data in response to the video data stream and the decoding clock;

a composite video generator coupled to the decoding clock circuit and the video data decoder for generating composite video data from the provided video data in response to the decoding clock; and a clock rate alignment circuit coupled to the composite video generator, to the means for receiving, and to the decoding clock circuit for changing the frequency of the decoding clock in response to the encoder clock signal and to video synchronization signals in the composite video data.

25. The combination of claim 24, wherein the video synchronization signals include a vertical blanking signal.

26. The combination of claim 24, wherein the video synchronization signals include a front porch signal.

* * * * *